Sept. 15, 1964　　　J. C. PHILLIPS　　　3,148,551
TORQUE AMPLIFIER

Filed June 7, 1960　　　　　　　　　　2 Sheets-Sheet 1

INVENTOR.
John Carroll Phillips
BY
Dawson, Tilton, Fallon & Lungmus

Sept. 15, 1964   J. C. PHILLIPS   3,148,551
TORQUE AMPLIFIER
Filed June 7, 1960   2 Sheets-Sheet 2
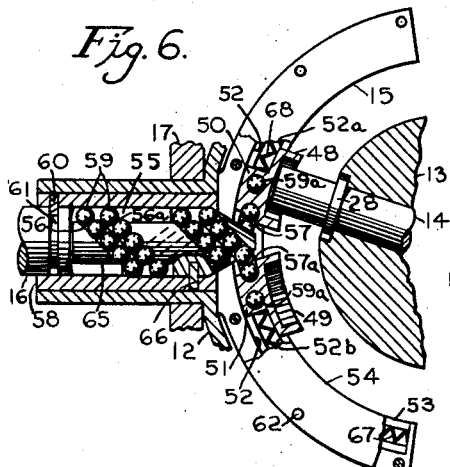
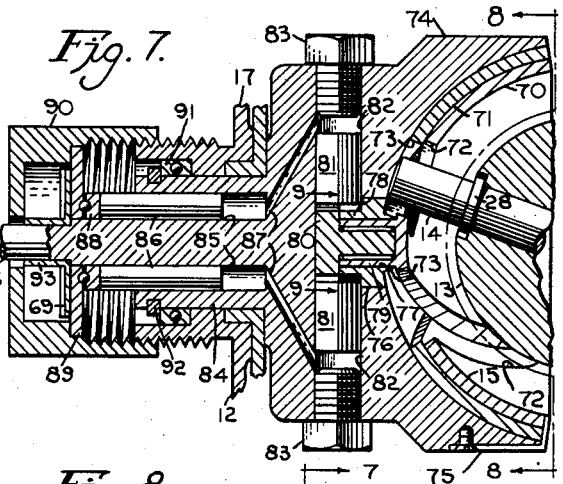
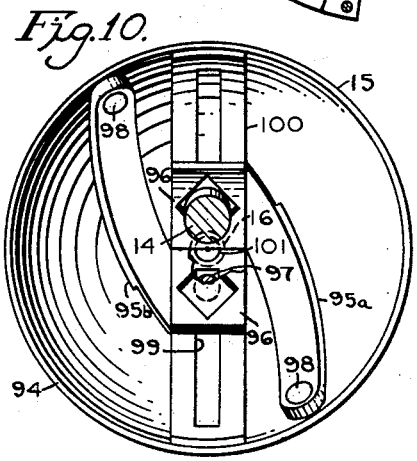
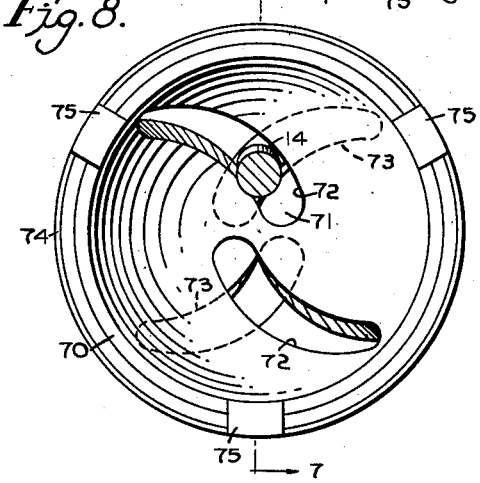
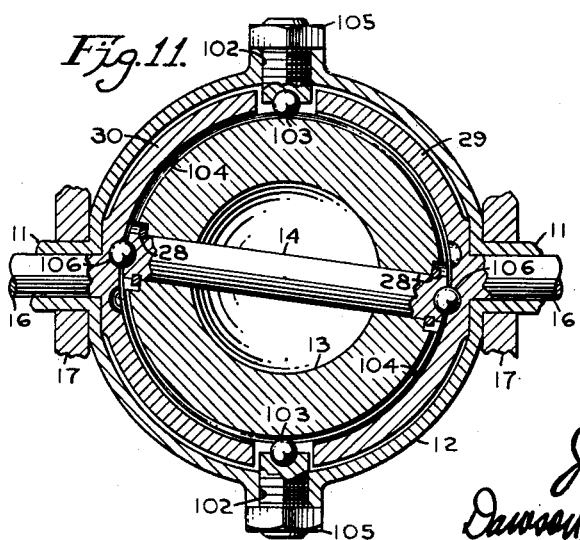
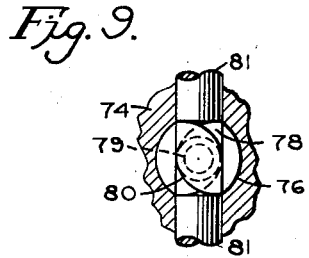
INVENTOR.
John Carroll Phillips
BY
Dawson, Tilton, Fallon & Lungmus United States Patent Office 3,148,551
Patented Sept. 15, 1964

3,148,551
TORQUE AMPLIFIER
John Carroll Phillips, 2405 Texas Ave., Tampa, Fla.
Filed June 7, 1960, Ser. No. 34,441
36 Claims. (Cl. 74—64)

This invention relates to forcing a universally mounted mass to precess, and more specifically, to a power transmission wherein a precessing mass is utilized to drive a load.

Rotary inertial transmissions are known in the art wherein a precessing mass is used to vary the inertial coupling between a drive and a driven shaft. While various means for forcing such a mass or inertial member to precess are known, the most common consists of having the drive member rotate the mass about an axis transverse to its spin axis in addition to spinning the mass. The gyroscopic reaction moment or torque to this forced precession is then applied to a mechanical member, or one of the gears of an epicyclic gear train, which couples the drive shaft to the driven shaft so that the motion of the drive shaft can be transmitted to the driven shaft.

It is apparent that where driving power is also used for inducing precession, less power is available for driving the load or, to put it differently, extra power must be supplied if the driving means is to cause precession of a mass as well as to drive the load at a given angular velocity. In either case, the efficiency of the transmission is adversely affected and, in addition, mechanical complications are likely to arise. However, in the absence of a more satisfactory arrangement, it has been the practice to utilize the driving force in a transmission of the rotary inertial type for the purpose of forcing precession of the mass or inertia member.

A principal object of the present invention is to provide a new and improved transmission wherein the load forces a mass to precess and the precessing mass drives the load. Another object is to provide a transmission for driving a load at substantially the precessional velocity of a mass, the transmission being of simple construction and being more efficient than devices heretofore known. Another object is to provide a transmission in which the load tilts the spin axis of a mass less and less as the spin velocity of the mass is increased, thereby increasing the precessional velocity and varying the torque so that the load can be brought up to speed automatically. Another object is to provide a mechanism in which the spin axis of a mass spinning at constant velocity is tilted by the force of a load, part of which can be selectively applied, so the resulting velocity of the mass will vary from almost zero as the load approaches maximum to a velocity approaching that of the spinning mass as the load approaches zero, thereby speeding up or slowing down the angular velocity and varying the torque of the driven shaft according to the changes in the load, selectively applied by an operator.

Other objects will appear from the specification and claims taken in conjunction with the accompanying drawings in which like parts are designated by like reference characters and in which:

FIGURE 6 is a longitudinal sectional view showing a portion of a transmission constituting a third embodiment of the invention;

FIGURE 7 is a broken longitudinal sectional view illustrating a portion of the transmission constituting a fourth embodiment of the invention;

FIGURE 8 is an internal view of the transmission with the mass removed therefrom, the view being taken along line 8—8 of FIGURE 7;

FIGURE 9 is a broken transverse sectional view taken along line 9—9 of FIGURE 7;

FIGURE 10 is an elevational view illustrating a portion of a transmission constituting a fifth embodiment of the invention, the mass being removed therefrom for purposes of illustration;

FIGURE 11 is a longitudinal sectional view of a modified transmission showing alternate means for universally mounting a rotatable mass.

In all of the forms of the invention shown and disclosed herein the transmission or torque amplifier includes a drive member connected to at least one drive shaft, an inertia element or mass universally mounted to the drive member, a connecting element carried by and projecting from the mass, precession actuating means operatively associated with the connecting element for changing the inclination of the spin axis of the mass, and at least one driven shaft connected to the precession actuating means for rotation therewith. In every instance the restraining force of a load is transmitted through the driven shaft to the precession actuating means which applies an external moment to the spinning mass, thereby causing the mass to precess and the precessional movement of the mass is then transmitted back to the driven shaft by the same actuating means which induced the precession.

A mounted flywheel in a gyroscope is frequently called a gyro, inertia element or mass, and its angular velocity is called the spin velocity. The external moment is the sum of all the moments about a fixed point of all the external forces acting on the mass, most of these forces are due to the load connected to the driven shaft. The gyroscopic reaction moment is the moment that is equal and opposite to the external moment. Procession is defined for purposes of this application as the resultant motion of the end of the spin or polar axis about the axis of the drive member. However, it should be noted that the resulting motion is the reaction to the forced rotation of the mass about two equatorial axes substantially 90 degrees apart. The velocity of the resultant motion is called the precessional velocity and the axis around which it rotates is called the precessional axis. It is understood that a mass must be spinning before it can precess. An inertia element mounted in gimbal rings or yokes in such a way that it can be rotated in any direction around the geometric center of its mounting or supporting system and allows the spin or polar axis to point in any direction in space is usually considered to be universally mounted. Thus, a mass mounted to one of the yokes of an universal joint of the ordinary or constant velocity type in a way that it can be rotated in any direction around the geometric center of the universal joint would be universally mounted within the limits of the yokes of the universal joint, also in a ball and socket joint the ball would be universally mounted within the limits of the socket. In this specification these terms are used in this regard.

Figure 1:
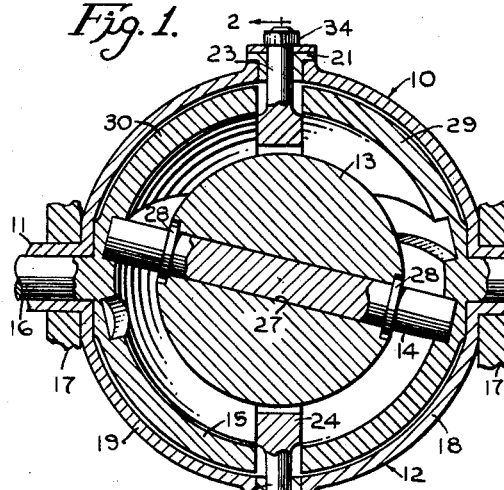
FIGURE 1 is a longitudinal cross sectional view through the center of a transmission embodying the present invention.
Figure 2:
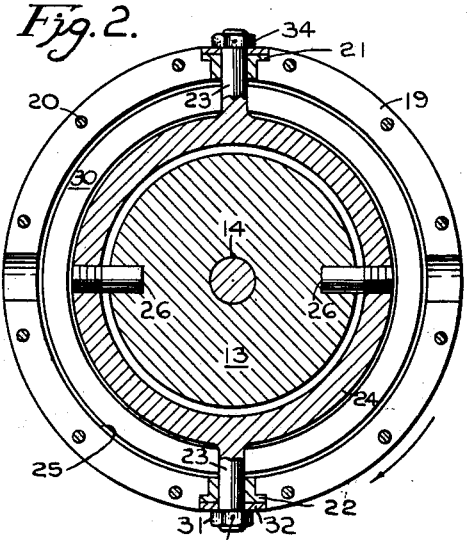
FIGURE 2 is a transverse cross sectional view through the center of the transmission taken along line 2—2 of FIGURE 1.
Figure 3:
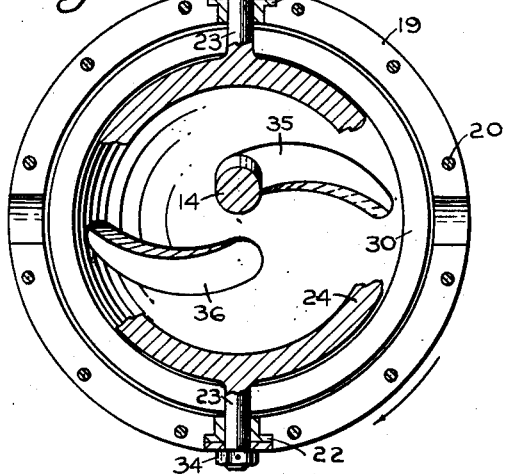
FIGURE 3 is a transverse cross sectional view similar to FIGURE 2 but showing the structure with the mass and a portion of the gimbal ring removed.

In the embodiment of the invention illustrated in FIGURES 1 through 3, the numeral 10 generally designates a torque amplifier including a pair of drive shafts 11, a drive member 12, an inertia element or mass 13, a connecting member 14, precession actuating means 15, and a pair of driven shafts 16. As shown in the drawings, the drive shafts are hollow with the driven shafts rotatably and coaxially disposed therein. The drive shafts 11 are in turn journaled in housing members 17. While two drive shafts and two driven shafts are shown in the drawings, it will be understood as the specification proceeds that only single drive and driven shafts may be provided.

The driven shafts may be connected to drive various types of loads. For example, the torque amplifier might be used in connection with machine tools, vehicles, instruments, stabilizing equipment, etc. Similarly, either of the drive shafts or input shafts 11 may be connected to any suitable power source, the specific nature of the power source depending upon the environment of the transmission.

In the illustration given, drive member 12 is composed of two identical and opposing hemispherical parts 18 and 19, each connected to or integrally formed with one of the drive shafts 11. These hemispherical parts or sections may be secured together by circumferentially spaced bolts 20 or by any other suitable means. Diametrically disposed bearings 21 and 22 are fixed in place between the connected faces of the hemispherical parts and are disposed at substantially 90 degrees with reference to the rotational axes of the drive shafts 11. The two bearings 21 and 22 rotatably support the radially projecting shafts 23 of a gimbal ring 24 located within the spherical chamber 25 of the drive member or casing 12. Thus, the gimbal ring is mounted for rotation about an axis extending at substantially right angles to the axis of rotation of the drive member 12. Nut 31, thrust washer 32 and pin 33 constitute a connecting unit generally designated by the numeral 34; two of these units (or other suitable connecting means) adjustably secure gimbal ring 24 in any desired axial position.

As shown most clearly in FIGURE 2, gimbal ring 24 is equipped with a pair of diametrically opposing inwardly projecting shafts 26 which have their axes in the same plane but at substantially right angles to the rotational axis passing through gimbal ring shafts 23. The inwardly directed shafts 26 project into and rotatably support the mass or inertia element 13. The spherical mass is therefore universally movable about the center of its mounting and, since the spin axis of that mass is incapable of being moved into complete register with the rotational axis of the drive member 12 for reasons which will hereinafter appear, the mass must rotate about its spin axis upon rotation of the drive member or casing.

Connecting element 14 comprises a cylindrical roller extending through the center of mass 13 and projecting outwardly beyond the periphery of that mass. The roller is rotatably carried within the cylindrical bore 27 of the mass and is held in place against axial movement by retaining rings 28 or other suitable means.

The precession inducing means 15 comprises a pair of substantially hemispherical members 29 and 30 rotatably disposed within the chamber 25 of casing 12 and fixed to or formed integrally with the respective driven shafts 16. The inside concave surface of each of the inner hemispherical members is provided with a pair of spiral grooves 35 and 36 respectively, one counterbalancing the other, as illustrated most clearly in FIGURE 3. One spiral groove of each hemispherical member rotatably receives an end portion of roller 14. It will be noted that each spiral groove originates near the rotational axis of the drive member or casing 12 and curves outwardly along the inner concave face of the respective hemispherical member 29 or 30, terminating near the opening of that member. Upon independent rotation of the grooved members with reference to the casing 12, roller 14 will be guided or cammed by the sides of the spiral grooves into a position closer to or farther away from the rotational axis of the casing and therefore the grooved members constitute cams for applying an external moment to mass 13. The two grooved cam members 29 and 30 are identical except that their spiral grooves receiving the ends of roller 14 curve in opposite directions, one spiraling outwardly in a clockwise direction and the other in a counterclockwise direction as viewed from the concave faces of the cams. The slope and pitch of the spirals may be varied to suit the use and load requirements of a given transmission. However, they must contact roller 14 at an angle so that a component of the external moment can force the mass to precess and so the resulting precession can rotate the load. The angle is between the radius vector and the tangent line at the point of contact on the curve of the cam projected on the plane passing through the center of the mass and perpendicular to the precessional axis. This angle must be acute to satisfy the above-stated conditions.

*Operation*

When the input or drive shafts 16 and the drive member 12 are rotated in a clockwise direction (as viewed in FIGURES 2 and 3), the mass 13 supported within gimbal ring 24 will likewise rotate in a clockwise direction. Should a load resist rotation of the output shafts 16, an external moment will be applied to the ends of roller 14 by the grooved cam members 29 and 30. Cam members 29 and 30 and the resulting precession will cause roller 14 to roll along the spiral grooves 35 away from the center of the cam members until the gyroscopic reaction moment of the mass presses roller 14 against the sides of the spiral cam grooves with a force equal to that of the total external moment. Cam members 29 and 30 and output shafts 16 will then begin to rotate about their axes in a clockwise direction, as viewed in FIGURES 2 and 3, and the load will rotate at the precessional velocity of the mass.

Should the spin velocity of the mass increase or should the load resistance decrease, or should both occur, then the torque amplification requirement will be reduced and the roller 14 will roll along the spiral cam grooves 35 to assume a new equilibrium position more nearly in alignment with the rotational axis of the drive member 12. This change in the inclination of the spin axis of the mass will result in an increase in its precessional velocity, thereby, automatically establishing the proper torque and speed ratios.

In the embodiment of the invention illustrated in FIGURES 1 through 3, double drive and output shafts and twin cam members 29 and 30 are provided. However, as indicated above, the double arrangement of input and output shafts is not necessary for operation of the structure. Furthermore, it will be understood that changes in the inclination of the spin axis of the mass may be effectively induced by only a single cam member and that the provision of double cam members is not necessary unless two shafts are needed to drive the load or loads. It is also to be understood that while mass 13 is shown as a sphere with its principal moments of inertial equal, these moments of inertia, the shape of the mass and the position of its center can be varied to suit the use requirements for a given installation.

Figure 4:
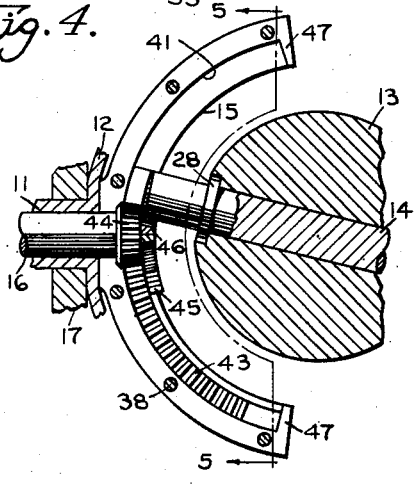
FIGURE 4 is a longitudinal mid sectional view of a portion of a transmission constituting a second embodiment of the present invention.
Figure 5:
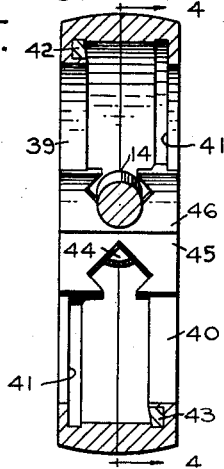
FIGURE 5 is a cross sectional view taken along line 5—5 of FIGURE 4.

The embodiment partially illustrated in FIGURES 4 and 5 is similar to the structure already described except for the precession inducing means 15. Unlike the first embodiment wherein the external moment is applied to roller 14 by means of one or more grooved cam members, the precession inducing means of the second embodiment comprises arcuate members 39 and 40 having spaced and generally semicircular channels or grooves 41 which slidably receive arcuate bevel gears 42 and 43. Members 39 and 40 are secured together by circumferentially spaced bolts 38 or by any other suitable means. Bevel gears 42 and 43 are identical in shape and size and mesh with another gear 44 disposed therebetween. Bevel gear 44 is secured to the inner end of output shaft 16 so that upon relative rotation of the output or driven shaft the bevel gears 42 and 43 will travel in opposite directions along their arcuate channels.

To each of the bevel gears 42 and 43 is affixed one of two roller retaining elements or sockets 45 and 46 respectively. Thus, referring to FIGURE 4, retaining socket 46 is affixed to the upper end portion of bevel gear 43 so that upon rotation of the output shaft 16 (when viewed from its inner end) the retaining socket 46 and bevel gear 43 will travel upwardly in an arcuate path. At the same time, socket 45, carried by bevel gear 42, will travel downwardly in an arcuate path in the opposite direction.

The hollow portion of socket 46 faces inwardly for rotatably receiving the end portion of roller or axle 14. Each face of the hollow portion of sockets 45 and 46 can be considered as a small section of groove 35 or 36 if curved or a plane containing the tangent line if straight. The angle between the radius vector and the tangent line at the point of contact is determined in the same manner and the faces of the socket contact roller 14 at this angle for the same reason mentioned with the cams. Consequently, the resultant external moment will be applied to mass 13 when the output shaft 16 rotates in such a way as to urge the sockets 45 and 46, carried by their respective bevel gears, towards or away from each other. It will be observed that only one of the two retaining sockets 45 and 46 is used to retain and guide movement of the roller 14, the other socket, in this case socket 45, and the bevel gear associated therewith (bevel gear 42) being provided for counterbalancing purposes.

Each of the arcuate channels 41 is substantially longer than the bevel gears slidably received therein to permit a sufficiently wide range of movement between the position illustrated in FIGURE 4 and a position wherein each of the sockets 45 and 46 is disposed adjacent the end of the channel in which its bevel gear slides. Stops 47 may be provided at opposite ends of each channel so as to limit the extent of sliding movement of the bevel gear received therein.

Mass 13, which is universally mounted within drive member 12 by the same type of gimbal assembly disclosed in connection with the previous embodiment (not shown in FIGURES 4 and 5), is set in rotation when input shaft 11 is driven and begins to precess when an external moment is applied by precession inducing means 15 which is in turn connected to the load through output shaft 16. Upon precession of the mass, roller 14 rotates members 39 and 40 around shaft 16 and the attached bevel gear 44. Since bevel gears 42 and 43 are meshed with bevel gear 44 they slide in their arcuate channels to tilt the spin axis of the mass more and more until the gyroscopic reaction moment is equal to the total external moment. To put it differently, when the roller 14 has been tilted sufficiently so that the gyroscope reaction moment and the external moment are equalized, there is no further relative motion between the gears and the output or driven shaft 16 rotates at the precessional velocity of the mass.

Like the embodiment of FIGURES 4 and 5, the form of the invention illustrated in FIGURE 6 is similar to the first embodiment (FIGURES 1–3) except for the means 15 by which the force of the load applies an external moment to the universally-mounted rotatable mass 13. In FIGURE 6, sockets 48 and 49 are similar to sockets 45 and 46 and one of these contacts roller 14 in the same manner and for the same reasons. Sockets 48 and 49 are integrally formed or attached to arcuate guides 50 and 51 which are slidably disposed within the generally semi-circular channel 52 in arcuate members 53 and 54. Members 53 and 54 are secured together by circumferentially spaced bolts 62 or by any other suitable means. Balls 59a in arcuate channels 52a and 52b retain guides 50 and 51 in channel 52. Rotatable member 53 is provided with an axially extending sleeve 58 which contain ball guide 65 and is attached to sleeve 58 by pin 66 or other suitable means. The ball guide has two spiral grooves 56 and 56a along its outer surface and these grooves communicate at the end of the ball guide extension with openings 57 and 57a in members 53 and 54. Opening 57 communicates in turn with the upper arcuate channel 52 and guide element 50 and opening 57a communicates in turn with the lower arcuate channel 52b and guide 51. Shaft 16 is extended to form a semi-cylindrical sleeve 55 cut at an angle as shown. Axial movement of shaft 16 and its extension 55 is prevented by pin element 60 provided by sleeve 58 and extending into annular recess 61 of the output shaft 16 or by other suitable means. Upon relative rotation of shaft 16 and arcuate members 53 and 54, balls 59 in grooves 56 and 56a are forced into or withdrawn from the arcuate channels 52a and 52b to shift or to permit the shifting of the guide members 50 and 51 along arcuate channel 52. It will be observed that only socket 48 and guide 50 are used to retain and guide the movement of roller 14, the other socket 49 and guide 51 are provided for counterbalancing purposes. Spring 67 counterbalances the centrifugal force acting on socket 49 and guide 51 and spring 68 counterbalances spring 67.

When the universally-mounted mass 13 begins to precess, arcuate members 53 and 54 start to rotate under the force exerted by roller 14. Assuming that output shaft 16 and its extension 55 are held stationary by the load, balls 59 will be urged into arcuate channels 52a so that the guide element 50 will be forced along channel 52 and thereby cause further tilting of the roller, and hence, the spin axis of the mass. As in the preceding embodiments, the outward tilting movement of the spin axis will continue until the gyroscopic reaction moment equals the total external moment. When that point is reached, relative rotation of arcuate members 53 and 54 and the output shaft 16 will cease and the arcuate members and output shaft will rotate together at the precessional velocity of the spinning mass.

In the form of the invention illustrated in FIGURES 7 through 9, the main distinguishing feature over the previously described embodiments lies in the fact that hydraulic means are utilized to tilt the spin axis of the mass 13 and thereby induce precession. In addition, the embodiment of FIGURES 7 through 9 includes a secondary structure for adjustably changing the external moment for controlling the rotational speed of output shaft 16.

In the illustration given, the precession inducing means 15 comprises a pair of concentric semi-spherical cam members 70 and 71 each provided with a pair of spiral slots 72 and 73 respectively. As shown in FIGURE 8, corresponding slots 72 and 73 of the two semi-spherical members intersect or overlap with the end portion of roller 14 projecting into the slots of one overlapping pair and contacting said cams at an angle for the same reason described with reference to the other embodiments. The other pair of overlapping slots (the lower pair 72 and 73 in FIGURE 8) are provided for counterbalancing purposes. Both cam members 70 and 71 are rotatably carried within the spherical chamber of a cylindrical driven member 74 and are retained therein by fasteners 75.

Cam member 71 is provided with an axially extending shaft portion 76 which has a bore 77 extending therethrough and which has an involute cam 78 formed at the end thereof. The other cam member 70 is also provided with an axially extending shaft portion 79 which extends through the bore 77 of shaft portion 76. Shaft portion 79 has an internal spline that fits a mating spline which is integrally formed or connected to a second involute cam 80. Pistons 81, slidably disposed within radially extending cylindrical chambers 82 in driven member 74, are adapted to bear against the curved surfaces of involute cams 78 and 80 so that upon inward movement of these pistons cam members 70 and 71 will be rotated in opposite directions and tilt roller 14 away from the rotational axis of the driven member 74 and driven shaft 16. The outer ends of bores 82 are threaded and are sealed off by threaded sealing elements 83.

Driven member 74 has an axial extension 84 provided with a pair of axially-extending cylinders 85. These cylinders contain pistons 86 and communicate with cylinders or chambers 82 by means of flow passages 87. Pistons 86 may be urged axially by thrust bearing 88 and thrust plate 89, the latter being retained within a cup-shaped adjusting member 90 which is threadedly mounted for axial movement upon stationary housing 17. The axial extension 84 of the driven member is held against axial movement within housing 17 by thrust bearing 91 and C-ring 92 or other suitable means. The shank of the driven member 74 extends through the extension 84 and is either formed integrally with or securely connected to driven shaft 16.

A brake member 93 is secured to the driven shaft 16 within the cavity of the cup-shaped adjusting member 90 and has a radial flange provided with an annular brake lining 69.

As adjusting member 90 is rotated upon the threaded extension of housing 17, thrust bearing 88 bears against pistons 86 and the hydraulic fluid within cylinders 85, cylinders 82 and passage 87 forces pistons 81 inwardly against involute cams 78 and 80, thereby rotating cam member 70 in a clockwise direction and cam member 71 in a counterclockwise direction as viewed in FIGURE 9. Roller 14 is urged radially away from the precessional axis of mass 13 as the cam members 70 and 71 rotate with the result that the angle between the precessional and spin axes is increased. Axial movement of the adjusting member stops when its inner face engages lining 69 of brake member 93.

When the mass 13 is spinning at a constant velocity and the brake member 93 engages adjusting member 90, driven member 74 will not revolve. If the adjusting member 90 is then rotated so that it moves axially away from the lining of the brake member, the brake will be released and the driven member 74 will commence rotation. For each setting of the adjusting member 90 the external moment changes and the driven member 74 will revolve at a different angular velocity, thereby enabling an operator to select any constant speed from the low to the high limit of the machine. If the adjusting member 90 is moved rapidly away from the lining 69 of the brake member 93, the load upon driven shaft 16 will automatically come up to speed. Once the load is up to speed and it is desired that it be stopped, the adjusting member 90 is rotated so it will move to the right, as viewed in FIGURE 7. The precessing mass will resist any effort to slow up its precessional velocity and will therefore act as a brake. The disk brake member 93 is provided for the final stages of stopping and to prevent creeping.

The form of the invention illustrated in FIGURE 10 is similar to the first embodiment (FIGURES 1-3) except for the means 15 by which the force of the load applies an external moment to the universally-mounted rotatable mass. In FIGURE 10, hemispherical member 94 is substantially the same as either of the members 29 or 30 and is fixed to or formed integrally with driven shaft 16 in the same manner. However, the spiral grooves 35 and 36 of the first embodiment are omitted and axle 101 is formed integrally with or fixed to member 94 along the axis of driven shaft 16 so that it extends through but not beyond link 100 which pivots about it.

The segmental ring-shaped links 95a and 95b are identical and are pivotally connected to the hemispherical member 94 by pins 98. At their opposite ends, links 95a and 95b are provided with identical sockets 96.

Axles 97 are integrally formed with or attached to the backs of socket 96 and extend into the slot 99 of link 100. The hollow portions of socket 96 are shaped to contact roller 14 in the same manner and for the same purpose as described in connection with the embodiment shown in FIGURES 4 through 6. It will be observed that only one link 95a is used to retain and guide the movement of roller 14, the other link 95b being provided for counterbalancing purposes.

When the universally mounted mass begins to precess, axle 97 slides along slot 99 and link 100 begins to rotate about axle 101 under the force applied by roller 14. Assuming that the output shaft 16 and member 94 are held stationary by the load, as axle 97 continues to slide along slot 99 links 95a and 95b turn about their pivots 98 and thereby cause further tilting of the roller, and hence, the spin axis of the mass. As in the preceding embodiments, the outward tilting movement of the spin axis will continue until the gyroscopic reaction moment equals the external moment. When that point is reached, link members 95a, 95b and 99 will cease to rotate about their respective pivots and this linkage and member 94 will rotate together at the precessional velocity of the spinning mass.

In all of the embodiments shown, as the spin velocity of the mass increases or the load resistance decreases, or both, the torque amplification requirement is reduced and the angle between the spin and precessional axes decreases. This increases the precessional velocity, thereby establishing the proper power to speed ratio automatically. If, in addition, selective control of the precessional velocity is desired, the means illustrated in FIGURES 7 through 9 may be adapted for use with any of the forms shown.

In all of the embodiments so far described, the rotatable mass may be universally mounted by means of a gimbal arrangement as shown in FIGURES 1-3. However, other means may be used to support the mass for universal movement, as previously mentioned and as represented by the modified construction of FIGURE 11.

In FIGURE 11, the spherical and hollow drive member 12 is provided with two circumferentially spaced threaded radial openings 102 disposed along the transverse mid plane of the drive member. The spherical mass 13, which may be hollow if desired and which has an annular semi-circular driving groove 104, is supported within the cavity of the drive member by driving balls 103 held in position by means of bearing retention elements 105 threaded into openings 102, and by ball bearings 106 disposed between the ends of roller 14 and the walls of cam members 29 and 30 within spiral cam grooves thereof. Thus, the mass 13 is driven by balls 103 in grooves 104 and supported for universal movement within the drive member by balls 103 and 106. In other respects, the embodiment illustrated in FIGURE 11 is substantially identical to the structure and operation of the form of the invention shown in FIGURES 1 through 3.

While in the foregoing I have disclosed several embodiments of the invention in considerable detail for purposes of illustration, it will be understood by those skilled in the art that many of these details may be varied without departing from the spirit and scope of the invention.

I claim:

1. In a torque amplifier provided with an output shaft, the combination of a mass adapted to be rotated about a spin axis, means universally mounting said mass for rotation around the geometric center of said mounting means and means connected to both said output shaft and said mass for tilting the spin axis of said mass in response to changes in the load upon said output shaft.

2. A transmission comprising an output shaft, a mass adapted to be rotated about a spin axis, means mounting said mass for rotation about said spin axis and for universal rotational movement around the geometric center of said mounting means and means connected to both said output shaft and said mass for tilting the spin axis of said mass in response to changes in the torque acting on said output shaft and for transmitting precessional movement of said mass to said output shaft for driving a load connected thereto.

3. The structure of claim 2 in which means are provided for selectively varying the torque transmitted by said shaft to said mass.

4. The structure of claim 3 in which said means for selectively varying the torque comprises a hydraulic system operatively associated with said first-mentioned means.

5. In a torque amplifier, the combination comprising a drive member, a mass, means universally mounting said mass to said drive member for rotation of said mass about a spin axis and for rotation of said mass around the geometric center of said mounting means, a driven shaft, and means operatively associated with said mass and said driven shaft and being responsive to changes in the angular velocity of said drive member and the torque acting on said driven shaft for tilting said spin axis and thereby causing precession of said mass, said means also operatively coupling said mass and driven shaft for rotating said driven shaft at the precessional velocity of said mass.

6. The structure of claim 5 in which said last-mentioned means includes an element connected to said mass and extending along the spin axis thereof, and at least one cam operatively associated with said driven shaft and said element for moving said element to tilt said spin axis in response to changes in the angular velocity of said drive member and the torque acting on said driven shaft.

7. The structure of claim 5 in which said last-mentioned means includes an element connected to said mass and extending along the spin axis thereof, and an arrangement of gears operatively associated with said driven shaft and said element for moving said element to tilt said spin axis in response to changes in the angular velocity of said drive member and the torque acting on said driven shaft.

8. The structure of claim 5 in which said last-mentioned means includes an element connected to said mass and extending along the spin axis thereof, and hydraulic means operatively associated with said driven shaft and said element for moving said element to tilt said spin axis in response to a change in the angular velocity of said drive member and the torque acting on said driven shaft.

9. The structure of claim 5 in which said last-mentioned means includes an element connected to said mass and extending along the spin axis thereof, and flexible means operatively associated with said driven shaft and said element for moving said element to tilt said spin axis in response to a change in the angular velocity of said drive member and the torque acting on said driven shaft.

10. The structure of claim 9 in which said flexible means comprise a series of bearing elements.

11. The structure of claim 5 in which said last-mentioned means includes an element connected to said mass and extending along the spin axis thereof, and linkage means operatively associated with said driven shaft and said element for moving said member to tilt said spin axis in response to a change in the angular velocity of said drive member and the torque acting on said driven shaft.

12. In a torque amplifier having input and output shafts, means affixed to said input shaft for universally supporting a mass, a mass universally supported by said means for rotation about an independent spin axis and for rotation around the geometric center of said supporting means, a connecting element carried by said mass and extending along the spin axis thereof, and precession inducing means connected to said output shaft and operatively associated with said connecting element for pivoting said element to tilt said mass about said center of said first-mentioned means and to cause precession of said mass in response to a load imposed upon said output shaft.

13. The structure of claim 12 in which said precession inducing means is connected to said output shaft for simultaneous rotation therewith and is attached to said connecting element for rotation at the precessional velocity of said mass.

14. The structure of claim 12 in which said precession inducing means comprises a rotatable cam member affixed to said output shaft and having a spiral cam portion engaging said connecting element.

15. The structure of claim 12 in which said precession inducing means comprises a gear member engaging said connecting element, said output shaft being provided with gear means operatively associated with said gear member for moving said element and thereby tilting the spin axis of said mass.

16. The structure of claim 12 in which said precession inducing means comprises a movable member operatively engaging said connecting element, and flexible means extending between said movable member and said output shaft for moving said member and thereby tilting the spin axis of said mass in response to a load imposed on said output shaft.

17. The structure of claim 16 in which said flexible means comprises a series of movable bearing elements.

18. The structure of claim 12 in which said precession inducing means comprises a movable member operatively engaging said connecting element, and linkage means operatively associated with both said movable member and said output shaft for moving said member and thereby tilting the spin axis of said mass in response to load variations.

19. The structure of claim 12 in which said precession inducing means includes hydraulic means operatively associated with said connecting element for pivoting the same.

20. In combination, a mass having a spin axis extending through its center, drive means for driving and supporting said mass for rotation around the geometric center of said supporting means, and load-actuated means connected to a driven member and operatively associated with said mass for forcing the mass to precess around the rotational axis of the drive means.

21. The structure of claim 20 in which said drive means rotatably supports said load-actuated means.

22. The structure of claim 20 in which said drive means includes a drive member provided with a cavity coaxial with the rotational axis thereof, said mass being mounted for universal movement within said cavity.

23. The combination of a rotatable drive member, a rotatable shaft adapted for connection to a load, and means actuated by load variations transmitted by said shaft for changing the direction of the spin axis of said inertia element around the geometric center of said drive member.

24. The structure of claim 23 in which said last-mentioned means is operatively associated with said inertia element and said shaft for rotating said shaft at the precessional velocity of said mass.

25. The structure of claim 23 in which said shaft and said drive member are rotatable about the same axis.

26. In a torque amplifier, a mass having a spin axis extending through its center, a drive shaft, means universally connecting said mass to said drive shaft for rotation of said mass simultaneously with the drive shaft but about a spin axis non-coincident with the rotational axis of said drive shaft, said means also mounting said mass for rotational movement around the geometric center of said mounting means, a driven shaft, a member connected to said mass and extending along the spin axis thereof, and at least one cam operatively associated with said driven shaft and with an end portion of said member for moving said member to tilt said spin axis in response to changes in the angular velocity of said drive shaft and the torque acting upon said driven shaft, and means operatively coupling said mass and driven shaft for rotating said driven shaft at the precessional velocity of said mass, the angle between the radius vector and the tangent line at the point of contact between said member and said cam projected on the plane passing through the center of said mass and perpendicular to the precessional axis being acute.

27. In a torque amplifier provided with an output shaft, the combination of a mass adapted to be rotated about a spin axis, means universally mounting said mass for rotation about said spin axis and for rotation around the geometric center of said mounting means, means connected to both said output shaft and said mass for tilting the spin axis of said mass in response to changes in the load upon said output shaft, and means for selectively varying the torque transmitted by said shaft to said mass, said last-mentioned means comprising a brake system operatively associated with said first-mentioned means.

28. In a torque amplifier, the combination of a drive member having at least one opening coaxial with its rotational axis, a mass, and means universally mounting said mass to said drive member.

29. In combination, a universally mounted mass, a connecting element carried by said mass, and means operatively associated with said connecting element for transmitting rotary movement of said mass to a driven shaft.

30. A torque amplifier comprising a driven member, a mass adapted to be rotated about a spin axis, means universally mounting said mass for rotation about said spin axis and for rotational movement around the geometric center of the mounting means, and means operatively connected to both said driven member and said mass for tilting said spin axis and thereby forcing said mass to precess in response to an external moment about the center of the universal mounting and for transmitting power from the precesing mass to said driven member.

31. In a torque amplifier provided with rotatable drive and driven members, the combination of a mass mounted to said drive member for universal movement around the geometric center of said drive member, a connecting element carried by said mass, and means operatively associated with said connecting element for transmitting power from said mass.

32. The structure of claim 31 in which said last-mentioned means comprises at least one cam operatively associated with said driven member and said connecting element for moving said mass around said geometric center of said drive member and for transmitting power from said mass.

33. The structure of claim 31 in which said last-mentioned means comprises an arrangement of gears operatively associated with said driven member and said connecting element for moving said mass around said geometric center of said drive member and for transmitting power from said mass.

34. The structure of claim 31 in which said last-mentioned means comprises flexible means operatively associated with said driven member and said connecting element for moving said mass around said geometric center of said drive member and for transmitting power from said mass.

35. The structure of claim 31 in which said last-mentioned means comprises hydraulic means operatively associated with said driven member and said connecting element for moving said mass around said geometric center of said drive member and for transmitting power from said mass.

36. The structure of claim 31 in which said last-mentioned means comprises an arrangement of links opertively associated with said driven member and said connecting element for moving said mass around said geometric center of said drive member and for transmitting power from said mass.

References Cited in the file of this patent

UNITED STATES PATENTS

| | | |
|---|---|---|
| 1,263,701 | Rhodes | Apr. 23, 1918 |
| 2,389,826 | Stalker | Nov. 27, 1945 |
| 2,390,341 | Williams | Dec. 4, 1945 |
| 2,946,241 | Snyder | July 26, 1960 |
| 2,960,889 | Keyser | Nov. 22, 1960 |

FOREIGN PATENTS

| | | |
|---|---|---|
| 399,505 | Germany | July 23, 1924 |
| 703,194 | France | Feb. 2, 1931 |